UNITED STATES PATENT OFFICE.

JOHN G. KETCHAM, OF COLDWATER, MICHIGAN.

PAVING COMPOSITION.

SPECIFICATION forming part of Reissued Letters Patent No. 10,414, dated November 27, 1883.

Original No. 277,743, dated May 15, 1883. Application for reissue filed August 25, 1883.

*To all whom it may concern:*

Be it known that I, JOHN G. KETCHAM, a citizen of the United States of America, residing at Coldwater, in the county of Branch and State of Michigan, have invented certain new and useful Improvements in Paving Compositions; and I do hereby declare the following to be a full, clear, and sufficient description of the invention, such as will enable others skilled in the art to which it appertains to make and use the same.

This invention relates to certain new and useful improvements in paving compositions; and it consists in the combination of the elements hereinafter set forth, and pointed out in the claims.

In utilizing my invention for a pavement the foundation is first laid, which consists of a layer of stone, brick, or other like material, being placed over the road-bed in the usual way of laying stone pavements, over which is spread a coating of coal-tar, pitch, and sand or gravel, all of which are mixed in about the following proportions, being heated and thoroughly mixed before applying over the base layer of stone or similar substances, while in its heated condition—to wit, two barrels of pitch and one of tar heated together. The coarse sand or gravel is heated in a separate pan until the moisture has been excluded, when it is thoroughly mixed with the hot pitch and tar, and, while hot, is spread over the base layer of bowlders or like material, being pressed down by the ordinary rollers used for similar purposes. On the top of this foundation, after the same has been thoroughly rolled, is laid another coating of composition, which forms the upper surface; and it consists of the following ingredients, in about these proportions, to wit: To one barrel of coal-tar add one-fourth of a barrel of pitch, one pint of liquid asphalt, four gallons of benzine, one pound of pulverized alum, one pound of sulphate of iron, two pounds of burnt umber, and one pint of asphalt. The mixture consisting of the benzine, sulphate of iron, burnt umber, and asphalt should be mixed in a vessel and well shaken before the mixture is added to the hot pitch and tar before mentioned. To twelve quarts of this mixture add one quart of slaked lime. The whole, when mixed, is spread over the first coat or foundation while in a hot condition. The surface is then coated with light sand, and then rolled or otherwise smoothed.

The component parts herein described form a surface that is durable and which is not slippery, and in appearance resembles sandstone.

Having thus described my invention in the most exact terms that I can give, what I claim as new, and desire to secure by Letters Patent, is—

1. The improved composition for under coat of pavements, consisting of a layer of stone, the same being covered with the mixture of coal-tar, pitch, and sand, as specified, and a top coat or dressing consisting of tar and lime with intermediate parts, as set forth.

2. The improved composition for a surface for a pavement, consisting of tar, pitch, asphalt, benzine, alum, sulphate of iron, burnt umber, and lime, incorporated with each other in about the proportions specified.

In testimony whereof I affix my signature in the presence of two witnesses.

JOHN G. KETCHAM.

Witnesses:

W. F. MALLOY,

A. N. BATCHELDER.